Patented Jan. 1, 1935

1,986,463

UNITED STATES PATENT OFFICE 1,986,463

VULCANIZATION OF RUBBER

Chester W. Christensen, Akron, Ohio, assignor to The Rubber Service Laboratories Company, Akron, Ohio, a corporation of Ohio No Drawing. Application October 5, 1932, Serial No. 636,423

14 Claims. (Cl. 18—53)

The present invention is directed to the art of producing vulcanized rubber. The invention is particularly concerned with a process of vulcanizing rubber wherein a new class of compounds obtained as hereinafter described and possessing desirable characteristics for the use described, is employed as an accelerator of the vulcanization process. The invention will be readily understood from the following specification wherein the novelty of the process is fully set forth and described.

The preferred new class of accelerators comprise the compounds produced by further treating with an organic acid the carbon disulfide derivative of the reaction product of an aldehyde and an aliphatic cyclic secondary amine. The reaction products indicated above are rapid and strong accelerators. Furthermore, tests have shown that the preferred class of accelerators are faster in their curing action than the corresponding carbon disulfide derivative of the reaction product of an aldehyde and an aliphatic cyclic secondary amine unreacted with an organic acid.

For example the following substances are typical members of the class of materials outlined above: the phthalic acid derivative of the product formed by reacting substantially equi-molecular proportions of methylene dipiperidine and carbon disulfide; the oxalic acid derivative of the product formed by reacting substantially equi-molecular proportions of methylene dipiperidine and carbon disulfide; the acetic acid derivative of the product formed by reacting substantially equi-molecular proportions of methylene dipiperidine and carbon disulfide; the benzoic acid derivative of the reaction product of substantially equi-molecular proportions of butylenedene dipiperidine and carbon disulfide; the phthalic acid derivative of the reaction product of substantially equi-molecular proportions of heptylidene dipiperidine and carbon disulfide; the oxalic acid derivative of the product formed by reacting substantially equi-molecular proportions of carbon disulfide and the product formed by reacting substantially two molecular proportions of piperidine and substantially one molecular proportion of crotonaldehyde; the phthalic acid derivative of the reaction product of substantially equi-molecular proportions of methylene dipipecoline and carbon disulfide; the oxalic acid derivative of the reaction product of substantially equi-molecular proportions of methylene dipipecoline and carbon disulfide; the succinic acid derivative of the reaction product of substantially equi-molecular proportions of carbon disulfide and methylene di alpha pipecoline and analogous products.

The following examples are specific embodiments of the present invention and not limitations thereof.

Example I

Substantially one molecular proportion of an aqueous solution of formaldehyde was added slowly to substantially two molecular proportions of piperidine at a temperature of substantially 25° to 41° C. After the reaction was completed the water formed was separated, the reaction product dried and substantially one molecular proportion of carbon disulfide added to the methylene dipiperidine so obtained at a temperature of substantially 20° to 48° C. To the carbon disulfide derivative produced thereby substantially one molecular proportion of phthalic acid was added thereto and the mixture heated on a steam bath. A viscous resin was formed which was incorporated in the well known manner in a rubber stock comprising

| | Parts |
|---|---|
| Pale crepe rubber | 100 |
| Zinc oxide | 5 |
| Sulfur | 3 |
| Accelerator | 1 |

The rubber stock thus compounded was vulcanized and the vulcanized rubber product tested. The test data follow in Table I.

Table I

| Cure | | Modulus of elasticity in lbs/in² at elongations of— | | | Tensile at break in lbs/in² | Ultimate elongation % |
|---|---|---|---|---|---|---|
| Time mins. | Lbs. steam pressure | 300% | 500% | 700% | | |
| 25 | 10 | 175 | 403 | 1565 | 2655 | 820 |
| 30 | 10 | 190 | 499 | 1925 | 3040 | 785 |
| 30 | 20 | 233 | 663 | 2635 | 3960 | 775 |
| 45 | 20 | 275 | 883 | 3495 | 4535 | 745 |
| 60 | 20 | 324 | 1065 | 4080 | 5015 | 750 |

From the data set forth in Table I it is shown that the preferred class of accelerators possess desirable characteristics in that a high modulus rubber product is produced at the lower steam pressures.

Example II

The oxalic acid derivative of the reaction product of substantially equi-molecular proportions of methylene dipiperidine and carbon disulfide was produced in a manner analogous to that employed for Example I except that substantially one-half a molecular proportion of oxalic acid was employed instead of one molecular proportion of phthalic acid as set forth therein. The product so obtained was incorporated in the usual manner in a rubber stock comprising

| | Parts |
|---|---|
| Pale crepe rubber | 100 |
| Zinc oxide | 5 |
| Sulfur | 2 |
| Red oxide | 0.25 |
| Stearic acid | 0.50 |
| Accelerator | 0.30 |

The rubber stock so compounded was then vulcanized and the vulcanized rubber product tested with the following results.

Table II

| Cure | | Modulus of elasticity in lbs/in² at elongations of— | | | Tensile at break in lbs/in² | Ultimate elongation % |
|---|---|---|---|---|---|---|
| Time mins. | Lbs. steam pressure | 300% | 500% | 700% | | |
| 25 | 10 | 136 | 292 | 973 | 2,570 | 880 |
| 30 | 10 | 152 | 375 | 1,310 | 2,715 | 840 |
| 15 | 20 | 155 | 354 | 1,115 | 2,420 | 845 |
| 30 | 20 | 212 | 519 | 1,880 | 3,420 | 820 |
| 45 | 20 | 232 | 624 | 2,365 | 3,765 | 800 |
| 60 | 20 | 218 | 613 | 2,455 | 3,520 | 770 |

*Example III*

The acetic acid derivative of the reaction product of substantially equi-molecular proportions of methylene dipiperidine and carbon disulfide was produced in a manner analogous to that employed in the preparation of Example I. The substance thus obtained was milled into a rubber stock comprising

| | Parts |
|---|---|
| Pale crepe rubber | 100 |
| Zinc oxide | 5 |
| Sulfur | 2 |
| Red oxide | 0.25 |
| Stearic acid | 0.50 |
| Accelerator | 0.30 |

The resulting compounded rubber stock was cured and the cured rubber product tested with results given in Table III.

Table III

| Cure | | Modulus of elasticity in lbs/in² at elongations of— | | | Tensile at break in lbs/in² | Ultimate elongation % |
|---|---|---|---|---|---|---|
| Time mins. | Lbs. steam pressure | 300% | 500% | 700% | | |
| 25 | 10 | 155 | 345 | 1,285 | 3,060 | 865 |
| 30 | 10 | 151 | 410 | 1,598 | 3,040 | 815 |
| 15 | 20 | 179 | 405 | 1,380 | 3,100 | 855 |
| 30 | 20 | 237 | 560 | 2,065 | 3,810 | 815 |
| 45 | 20 | 244 | 675 | 2,570 | 3,810 | 765 |
| 60 | 20 | 239 | 713 | 2,810 | 3,795 | 755 |

From the examples hereinbefore set forth comprising specific embodiments of the invention it is shown that the organic acid derivatives of the product formed by reacting carbon disulfide with the reaction product of an aldehyde and an aliphatic cyclic secondary amine comprise an effective group of vulcanization accelerators, which are rapid in their accelerating action and are particularly adapted for use at the lower temperature cures.

Obviously, the practice of this invention is not limited to the specific compositions given above, such compositions being merely illustrative of methods of employing the accelerators of this invention. The present invention is limited solely by the appended claims wherein it is intended to claim the invention as broadly as possible in view of the prior art.

What is claimed is:

1. A process of treating rubber which comprises heating rubber and sulfur in the presence of an accelerator comprising an organic acid derivative of the product formed by reacting substantially equi-molecular proportions of carbon disulfide and the reaction product of substantially one molecular proportion of an aliphatic aldehyde and substantially two molecular proportions of an aliphatic cyclic secondary amine.

2. A process of treating rubber which comprises heating rubber and sulfur in the presence of an accelerator comprising an organic acid derivative of the product formed by reacting substantially equi-molecular proportions of carbon disulfide and the reaction product of substantially one molecular proportion of an aliphatic aldehyde and substantially two molecular proportions of a piperidine.

3. A process of treating rubber which comprises heating rubber and sulfur in the presence of an accelerator comprising an aliphatic organic acid derivative of the product formed by reacting substantially equi-molecular proportions of carbon disulfide and the reaction product of substantially one molecular proportion of an aliphatic aldehyde and substantially two molecular proportions of a piperidine.

4. A process of treating rubber which comprises heating rubber and sulfur in the presence of an accelerator comprising the acetic acid derivative of the product formed by reacting substantially equi-molecular proportions of carbon disulfide and methylene dipiperidine.

5. A process of treating rubber which comprises heating rubber and sulfur in the presence of an accelerator comprising the reaction product of substantially equi-molecular proportions of acetic acid and the product formed by reacting substantially equi-molecular proportions of methylene dipiperidine and carbon disulfide.

6. A process of treating rubber which comprises heating rubber and sulfur in the presence of an accelerator comprising an aliphatic organic acid derivative of the product formed by reacting substantially equi-molecular proportions of carbon disulfide and an alkylidene dipiperidine.

7. A process of treating rubber which comprises heating rubber and sulfur in the presence of an accelerator comprising the acetic acid derivative of the product formed by reacting substantially equi-molecular proportions of carbon disulfide and an alkylidene dipiperidine.

8. The vulcanized rubber product produced by heating rubber and sulfur in the presence of an accelerator comprising an organic acid derivative of the product formed by reacting substantially equi-molecular proportions of carbon disulfide and the reaction product of substantially one molecular proportion of an aliphatic aldehyde and substantially two molecular proportions of an aliphatic cyclic secondary amine.

9. The vulcanized rubber product produced by heating rubber and sulfur in the presence of an accelerator comprising an organic acid derivative of the product formed by reacting substantially equi-molecular proportions of carbon disulfide and the reaction product of substantially one molecular proportion of an aliphatic aldehyde and substantially two molecular proportions of a piperidine.

10. The vulcanized rubber product produced by heating rubber and sulfur in the presence of an accelerator comprising an aliphatic organic acid derivative of the product formed by reacting substantially equi-molecular proportions of carbon disulfide and the reaction product of substantially one molecular proportion of an aliphatic aldehyde and substantially two molecular proportions of a piperidine.

11. The vulcanized rubber product produced by heating rubber and sulfur in the presence of an accelerator comprising the acetic acid derivative of the product formed by reacting substantially equi-molecular proportions of carbon disulfide and methylene dipiperidine.

12. The vulcanized rubber product produced by heating rubber and sulfur in the presence of an accelerator comprising the reaction product of substantially equi-molecular proportions of acetic acid and the product formed by reacting substantially equi-molecular proportions of methylene dipiperidine and carbon disulfide.

13. The vulcanized rubber product produced by heating rubber and sulfur in the presence of an accelerator comprising an aliphatic organic acid derivative of the product formed by reacting substantially equi-molecular proportions of carbon disulfide and an alkylidene dipiperidine.

14. The vulcanized rubber product produced by heating rubber and sulfur in the presence of an accelerator comprising the acetic acid derivative of the product formed by reacting substantially equi-molecular proportions of carbon disulfide and an alkylidene dipiperidine.

CHESTER WM. CHRISTENSEN.